UNITED STATES PATENT OFFICE 2,670,371

BASIC ALKYL SUBSTITUTION PRODUCTS OF N-INDANYL AND N-TETRAHYDRONAPHTHYL - MONOCARBOCYCLYLAMIDES AND THEIR SALTS

John W. Cusic, Skokie, Ill., assignor to G. D. Searle & Co., Chicago, Ill., a corporation of Illinois No Drawing. Application August 1, 1951,
Serial No. 239,837

7 Claims. (Cl. 260—557)

1

The present invention relates to a new group of organic chemicals and, specifically, to the new amides of the structural formula

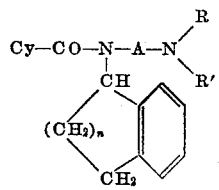

and salts thereof, wherein Cy is a lower monocyclic hydrocarbon radical attached to the —CO— radical through a nuclear carbon atom, A is a lower bivalent saturated aliphatic hydrocarbon radical, $n$ is an integer smaller than three, and NRR' is either a lower dialkylamino radical or a nitrogen-containing heteromonocyclic radical attached through a nitrogen in the heteromonocycle to the radical A.

In the foregoing structural formula Cy can be a lower cycloaliphatic radical such as cyclopropyl, cyclobutyl, cycloamyl, and cyclohexyl as well as a lower alkyl substitution product thereof such as methylcyclopentyl, ethylcyclohexyl or isopropylcyclohexyl. Cy can also be a lower monocyclic aryl radical such as phenyl, tolyl, xylyl, cymyl and other alkylphenyl radicals.

The radical A represents a bivalent, saturated, aliphatic hydrocarbon radical of from two to eight carbon atoms; this radical is derived from a straight-chain or branched-chain aliphatic hydrocarbon such as ethylene, propylene, butylene, amylene or a polymethylene radical such as trimethylene, tetramethylene, pentamethylene, and hexamethylene.

Among the radicals which R and R' represent are such lower alkyl groups as methyl, ethyl, propyl, butyl, amyl, hexyl, wherein the propyl, butyl, amyl and hexyl groups may be either of the straight-chain or branched-chain type. The radical NRR' may also be a part of a nitrogen containing heterocyclic group such as piperidine, lupetidine, pyrrolidine, morpholine, thiamorpholine, piperazine, N'-alkylpiperazine and the like.

The organic bases of the foregoing type form salts with a variety of inorganic and strong organic acids including sulfuric, phosphoric, hydrochloric, hydrobromic, sulfamic, citric, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide; phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The compounds which constitute this invention are valuable as intermediates in organic synthesis. These amides are of value as cardiovascular and renal drugs, specifically as diuretics.

The amides which constitute this invention are prepared conveniently by reacting an amine of the structural formula

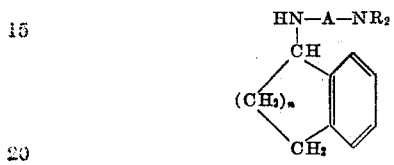

with an acid halide of the formula

Cy—CO—halogen at refluxing temperature. The resulting hydrohalide is suitably extracted from the reaction mixture with hydrochloric acid.

My invention is disclosed in further detail by the following examples which are set forth for the purpose of illustrating this invention and which are in no way to be construed as limiting the invention in spirit or in scope. It will be apparent to those skilled in the art that many conventional modifications in methods, conditions, and materials can be adopted without departing therefrom. In the examples the temperatures are given uncorrected in degrees centigrade, pressures during vacuum distillation in millimeters of mercury and quantities in part by weight.

EXAMPLE 1

*N-(β-diethylaminoethyl)-N-(1-indanyl) cyclohexanecarboxamide*

A mixture of 132 parts of indanone, 116 parts of 1-diethylamino-2-aminoethane, 120 parts of ethanol and 30 parts of Raney nickel is hydrogenated at 140° C. at 700 lbs. pressure for 7 hours. After cooling the catalyst is removed by filtration and the solvent evaporated from the filtrate. The N-(β-diethylaminoethyl)-1-indanamine is distilled at about 128° C. and 1.5 mm. pressure. 218 parts of the distillate are heated with 146 parts of cyclohexanecarbonyl chloride in 1600 parts of benzene at reflux temperature for one hour. After cooling the solution is extracted with dilute hydrochloric acid, and the aqueous layer is washed with ether, rendered alkaline by addition of sodium hydroxide and extracted with ether. The ether extract is dried over anhydrous potassium carbonate, filtered and evaporated. The remaining N-(β-diethylaminoethyl)-N-(1-indanyl)cyclohexanecarboxamide is distilled at about 194–196° C. at 1 mm. pressure. It has the structural formula

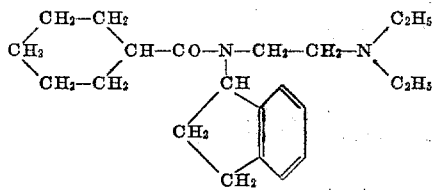

EXAMPLE 2

*N-(β-diethylaminoethyl)-N-(1-indanyl)-benzamide*

A mixture of 218 parts of N-(β-diethylaminoethyl)-1-indanamine, 160 parts of benzoyl chloride and 1600 parts of benzene is heated at reflux temperature for 90 minutes. After cooling the mixture is treated with dilute hydrochloric acid. The aqueous layer is separated, rendered alkaline by addition of dilute sodium hydroxide and extracted with ether. The ether extract is dried over anhydrous potassium carbonate, filtered and evaporated. The N-(β-diethylaminoethyl)-N-(1-indanyl)benzamide is distilled at about 188–190° C. and 1 mm. pressure. It has the structural formula

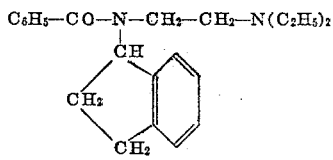

EXAMPLE 3

*1-(γ-morpholinopropyl)-N-(1-indanyl)-3,4-dimethylbenzamide*

N-(γ-morpholinopropyl)-1-indanamine is prepared by hydrogenation of 132 parts of indanone and 130 parts of γ-aminopropylmorpholine in a Parr bomb with Raney nickel and ethanol. 232 parts of the amine thus obtained are heated at reflux temperature with 170 parts of 3,4-dimethylbenzoyl chloride and 2000 parts of benzene for 2 hours. The reaction mixture is then poured on ice and dilute hydrochloric acid. The aqueous layer is separated, washed with ether and rendered alkaline by addition of ammonium hydroxide. The base is extracted with ether, dried over anhydrous potassium carbonate, filtered and evaporated. The 1-(γ-morpholinopropyl)-N-(1-indanyl)-3,4-dimethylbenzamide thus obtained has the structural formula

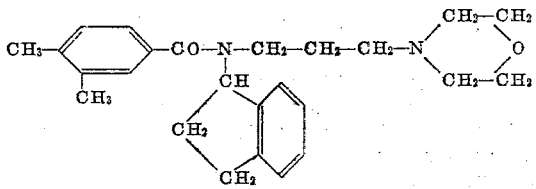

EXAMPLE 4

*N-(β-diethylaminoethyl)-N-[1-(1,2,3,4-tetrahydro)naphthyl]cyclohexanecarboxamide*

The N-(β-diethylaminoethyl)-1-tetrahydronaphthylamine is obtained by hydrogenation of 438 parts of α-tetralone and 348 parts of 1-diethylamino-2-aminoethane in the presence of ethanol and platinum dioxide in a bomb. The product is isolated and distilled at about 150° C. and 3 mm. pressure. 200 parts of the distillate are heated with 110 parts of cyclohexanecarbonyl chloride in 1600 parts of benzene at reflux temperature for 3 hours. The resulting solution is extracted with dilute hydrochloric acid and the extract rendered alkaline by the addition of sodium hydroxide. The base is extracted with ether and the ether extract dried over anhydrous potassium carbonate, filtered and evaporated. The N-(β-diethylaminoethyl)-N-[1-(1,2,3,4-tetrahydro)naphthyl]cyclohexanecarboxamide is distilled at about 190–192° C. and 1 mm. pressure. It has the structural formula

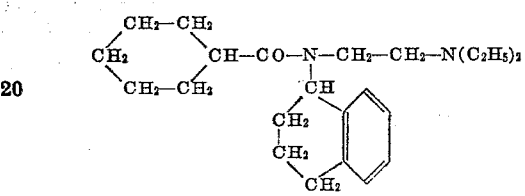

EXAMPLE 5

*N-(β-diethylaminoethyl)-N-[1-(1,2,3,4-tetrahydro)naphthyl]benzamide*

A mixture of 200 parts of N-(β-diethylaminoethyl)-1-tetrahydronaphthylamine and 160 parts of benzoyl chloride in 1600 parts of benzene is heated at reflux temperature for 2 hours. After cooling the solution is extracted with dilute hydrochloric acid and the aqueous layer is separated, rendered alkaline by addition of sodium hydroxide and extracted with ether. The ether extract is dried over anhydrous potassium carbonate, filtered and evaporated. The residue is distilled at about 203–205° C. and 1 mm. pressure. An ether solution of the N-(β-diethylaminoethyl)-N-[1-(1,2,3,4-tetrahydro)naphthyl]benzamide is treated with a 25% solution of hydrogen chloride in anhydrous isopropanol. The initially oily hydrochloride solidifies on standing. Crystallized from ethyl acetate the hydrochloride melts at about 147–148° C. The base has the structural formula

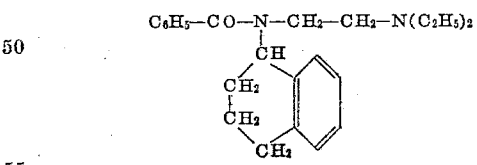

EXAMPLE 6

*N-(δ-dimethylaminobutyl)-N-(1-tetrahydronaphthyl)fencholamide*

N-(δ-dimethylaminobutyl)-1-tetrahydronaphthylamine is prepared by hydrogenation of 219 parts of α-tetralone and 174 parts of N,N-dimethylputrescine in the presence of platinum dioxide and Raney nickel. 100 parts of the resulting base are heated with 95 parts of fencholic acid chloride in 150 parts of benzene at reflux temperature for 2 hours. The reaction mixture is then poured over ice and dilute hydrochloric acid. The aqueous layer is separated, washed with ether and rendered alkaline by the addition of sodium hydroxide. The base is extracted with ether and the ether extract dried over anhydrous potassium carbonate, stirred with decolorizing charcoal, filtered and evaporated. The N-(δ-methylaminobutyl)-N-(1-tetrahydronaphthyl)- fencholamide is obtained as an oil and has the structural formula $$(CH_3)_2-CH-CH-CH_2 \quad CH_3$$
(structure: C-CO-N-CH_2-CH_2-CH_2-CH_2-N(CH_2)_2, with cyclopentane and tetrahydronaphthyl substituents)

EXAMPLE 7

N-(γ-piperidinopropyl)-N-(1-tetrahydronaphthyl) cyclopropanecarboxamide

A mixture of 146 parts of α-tetralone and 134 parts of γ-aminopropylpiperidine is hydrogenated with 150 parts of ethanol and 10 parts of Raney nickel in a Parr bomb at about 135° C. and 600 lbs. pressure for 10 hours. The contents are filtered and treated with dilute hydrochloric acid. The aqueous solution is washed with ether, rendered alkaline and extracted with ether. The ether extract is dried over anhydrous potassium carbonate, filtered and evaporated. 273 parts of N-(γ-piperidinopropyl)-1-tetrahydronaphthylamine are heated with 110 parts of cyclohexanecarbonyl chloride in 1600 parts of benzene for 2 hours. After cooling the reaction mixture is treated with dilute hydrochloric acid and the aqueous layer is washed with ether and rendered alkaline by the addition of sodium hydroxide. The base is extracted with ether, dried over anhydrous potassium carbonate, stirred with decolorizing charcoal, filtered and evaporated. The residual oil consists of N-(γ-piperidinopropyl)-N-(1-tetrahydronaphthyl)cyclopropanecarboxamide which has the structural formula (structure shown)

I claim:

1. The amides of the structural formula $$Cy-CO-N-A-N\underset{R'}{\overset{R}{\diagdown}}$$

(with tetrahydronaphthyl group, (CH_2)_n)

wherein Cy is a lower cycloalkyl radical, A is a lower alkylene radical separating the two nitrogen atoms by at least two carbon atoms, n is an integer smaller than three and greater than zero, and R and R' are lower alkyl radicals.

2. The amides of the structural formula $$Cy-CO-N-A-NRR'$$

(with tetrahydronaphthyl group)

wherein Cy is a lower cycloalkyl radical, A is a lower alkylene radical separating the two nitrogen atoms by at least two carbon atoms, and R and R' are lower alkyl radicals.

3. The amides of the structural formula (cyclopentane-CH-CO-N-A-NRR' with tetrahydronaphthyl)

wherein A is a lower alkylene radical separating the two nitrogen atoms by at least two carbon atoms and R and R' are lower alkyl radicals.

4.

(cyclopentane-CH-CO-N-CH_2CH_2-N(C_2H_5)_2 with tetrahydronaphthyl)

5. The amides of the structural formula $$Cy-CO-N-A-NRR'$$

(with tetrahydronaphthyl)

wherein Cy is a lower cycloalkyl radical, A is a lower alkylene radical separating the two nitrogen atoms by at least two carbon atoms, and R and R' are lower alkyl radicals.

6. The amides of the structural formula (cyclopentane-CH-CO-N-A-NRR' with tetrahydronaphthyl)

wherein A is a lower alkylene radical separating the two nitrogen atoms by at least two carbon atoms, and R and R' are lower alkyl radicals.

7.

(cyclopentane-CH-CO-N-CH_2CH_2-N(C_2H_5)_2 with tetrahydronaphthyl)

JOHN W. CUSIC.

References Cited in the file of this patent

UNITED STATES PATENTS

| Number | Name | Date |
|---|---|---|
| 2,009,144 | Miescher et al. | July 23, 1935 |

FOREIGN PATENTS

| Number | Country | Date |
|---|---|---|
| 46,595 | Denmark | Dec. 5, 1932 |
| 464,530 | Great Britain | Apr. 20, 1937 |